Aug. 4, 1931.   A. W. PHELPS ET AL   1,817,462
ASSEMBLING MACHINE
Filed Nov. 29, 1929   6 Sheets-Sheet 4

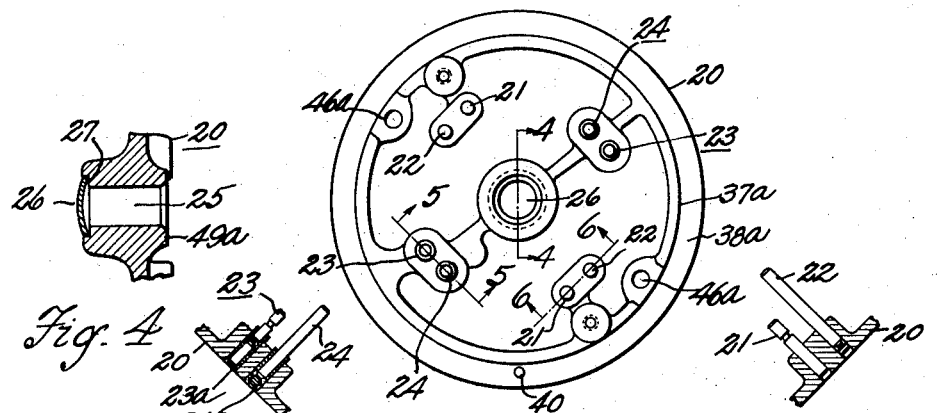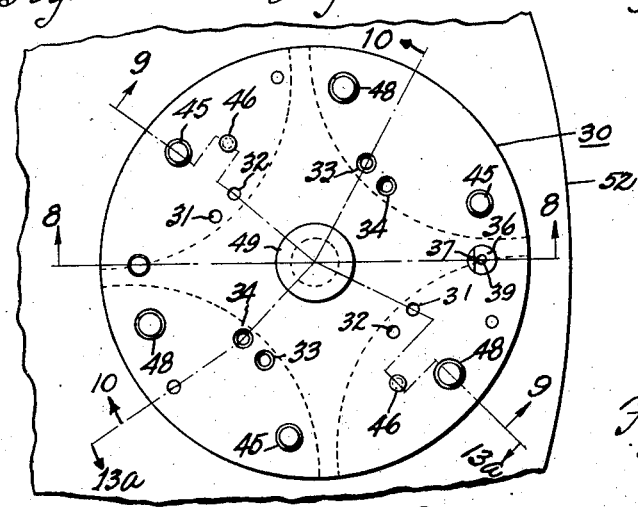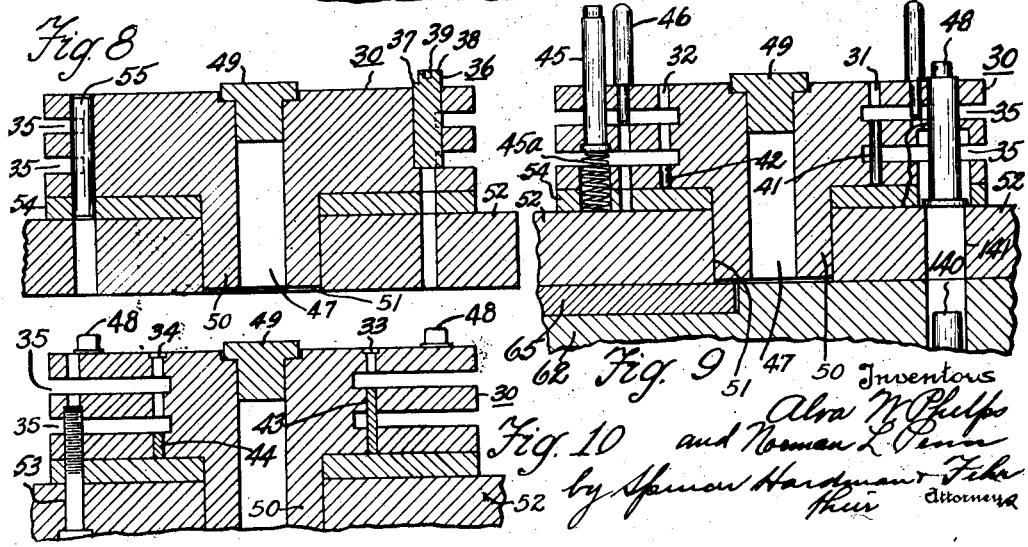

Inventors
Alva W. Phelps
and Norman L. Penn
By Spencer Hardman & Fehr
Their Attorneys

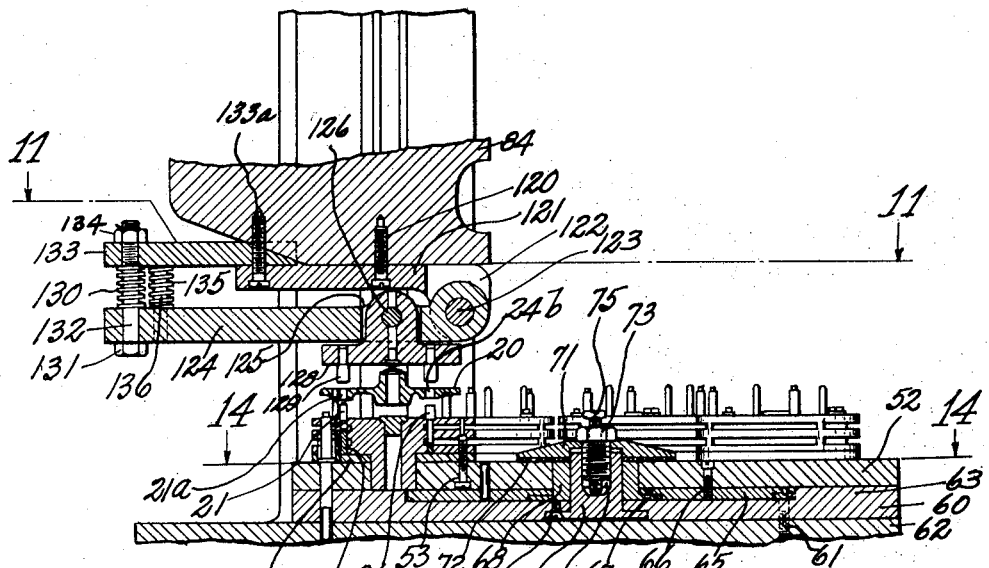
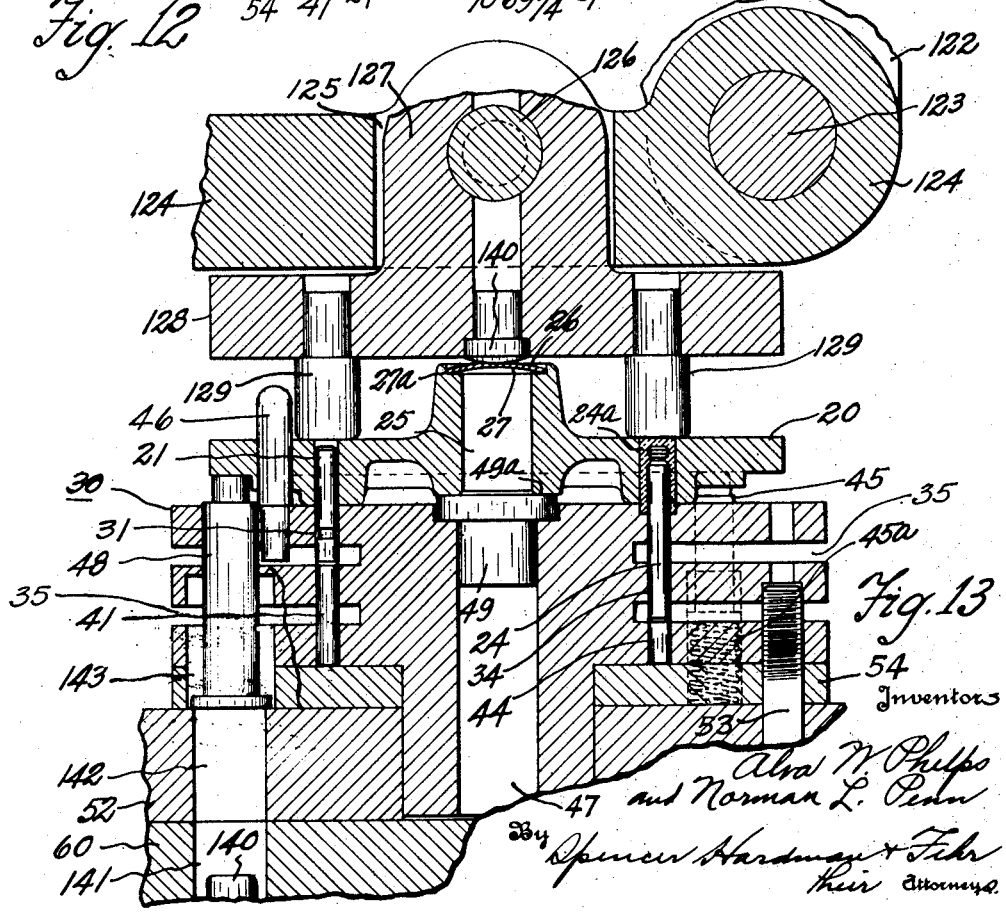

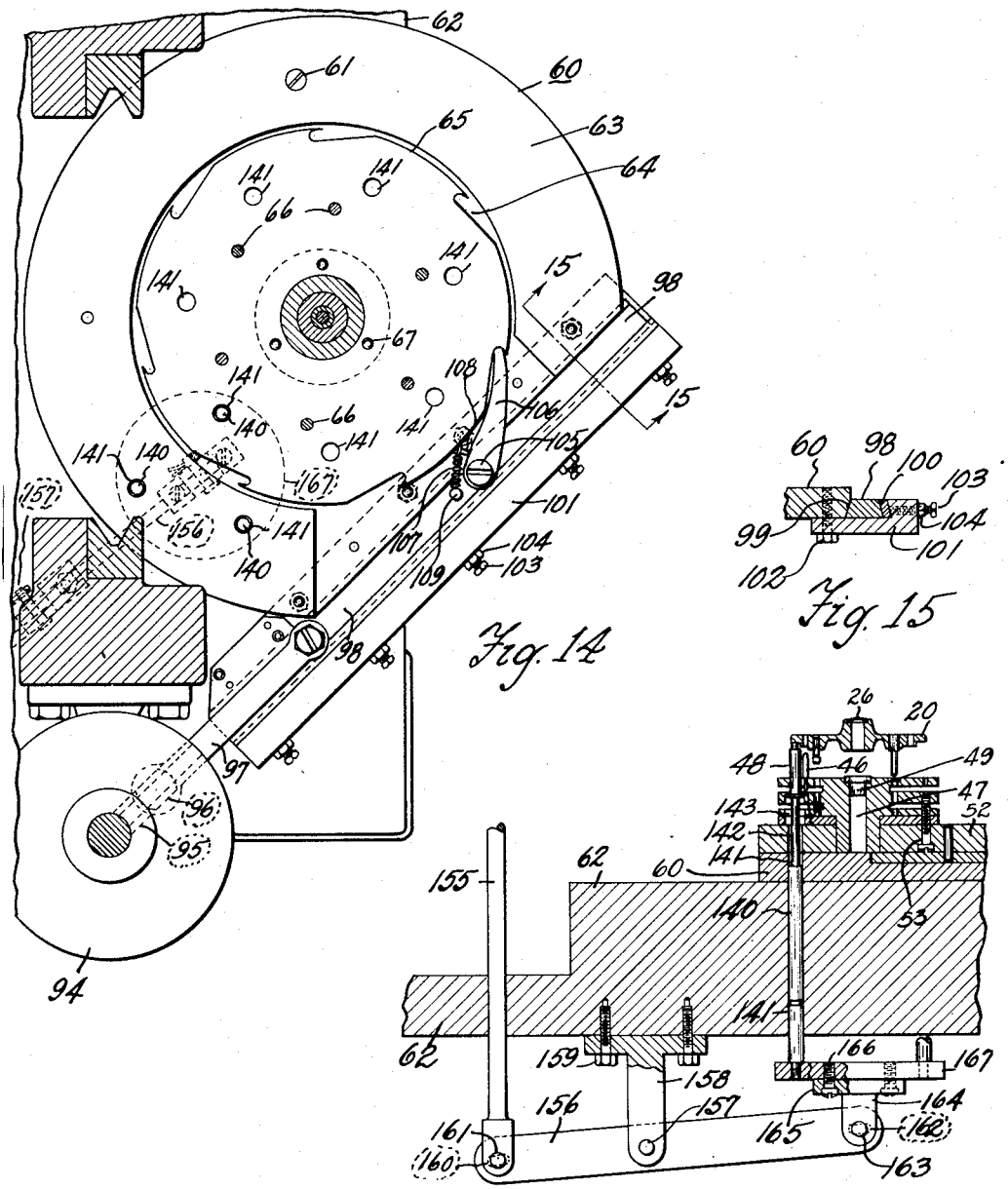

Patented Aug. 4, 1931

1,817,462

UNITED STATES PATENT OFFICE

ALVA W. PHELPS AND NORMAN L. PENN, OF ANDERSON, INDIANA, ASSIGNOR TO DELCO-REMY CORPORATION, OF ANDERSON, INDIANA, A CORPORATION OF DELAWARE

ASSEMBLING MACHINE

Application filed November 29, 1929. Serial No. 410,546.

This invention relates to apparatus for assembling parts which are attached by driving or press fitting one part into a recess provided by another part.

It is one of the objects of the present invention to provide a machine for facilitating the assembly of relatively flat objects such as the end frames of dynamo electric machines with studs, pins and similar parts by which the dynamo brush rigging is supported by the end frame.

In order to accomplish this object the present invention provides a turn table conveyor which supports a plurality of work holders, each of the work holders being constructed so as to receive the pins, studs and the like which are to be attached to the dynamo frame and to receive and support the dynamo frame at an elevation above the studs. Each work holder is provided with recesses for receiving the pins and studs, said recesses being located in conformity to the recesses in the dynamo frame which respectively receive the pins and studs, and each work holder is provided with locating devices which position the dynamo frame so that its recesses will be located in alignment respectively with the various pin and stud receiving recesses of the work holder. The work holders are moved successively under a punch press operated member which, when moving downwardly, forces a dynamo field frame toward a work holder in order that the studs and pins will be forced into the recesses provided by the dynamo frame. Following this operation the work holder carrying the assembled work passes to a station where the work is ejected from the work holder.

The present machine provides an additional feature, namely, that of forcing into a suitable recess a cap or disc which closes one end of a shaft bearing recess provided by the dynamo frame.

Further objects and advantages of the present invention will be apparent from the following description, reference being had to the accompanying drawings wherein a preferred embodiment of one form of the present invention is clearly shown.

In the drawings:

Fig. 3 is a plan view of the assembled work including a dynamo end frame and brush holder studs and pins assembled therewith.

Figs. 4, 5 and 6 are sectional views taken respectively on the lines 4—4, 5—5 and 6—6 of Fig. 3.

Fig. 7 is a fragmentary plan view on a larger scale of a portion of the turn table conveyor upon which is located a work holder.

Figs. 8, 9, and 10 are sectional views taken respectively on the lines 8—8, 9—9 and 10—10 of Fig. 7.

Figure 11:
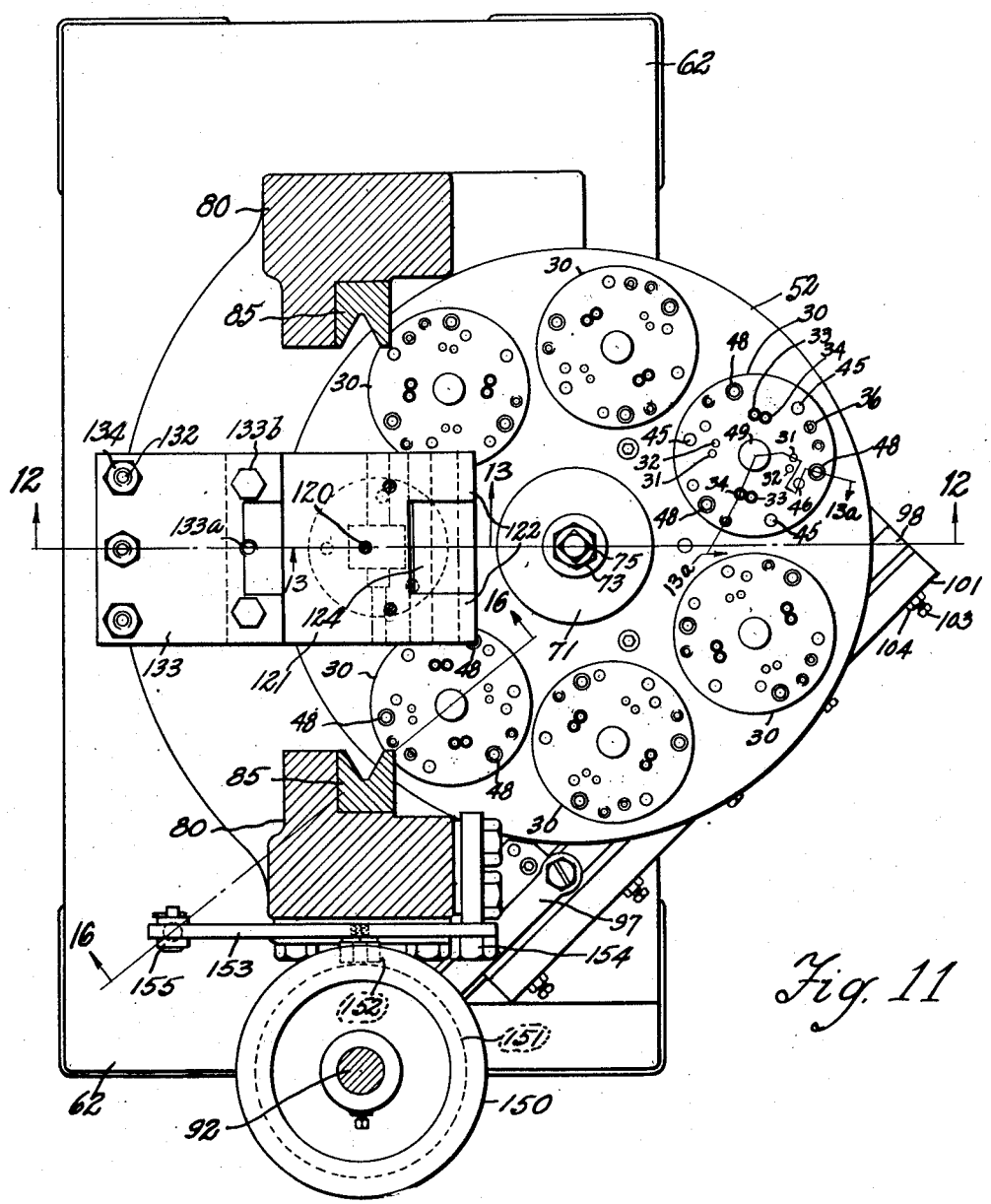

Fig. 11 is a plan view of the conveyor and punch press operated member for forcing a dynamo frame against the studs and pins held by a work holder, and Fig. 11 is partly in section taken on the line 11—11 of Fig. 12.

Fig. 12 is a sectional view on the line 12—12 of Fig. 11.

Fig. 13 is a fragmentary sectional view of a portion of the machine as shown in Fig. 12 and shows the punch press operated member after having been moved into its lowermost position for the purpose of assembling the work pieces, Fig. 13 being drawn to a larger scale than Fig. 12.

In Figs. 12 and 13 the sectional views through the work holder are taken on the line 13—13 of Fig. 11, this section being the same as one which would be taken on the line 13a—13a of Figs. 7 or 11.

Fig. 14 is a sectional view on the line 14—14 of Fig. 12.

Fig. 15 is a sectional view on the line 15—15 of Fig. 14.

Fig. 16 is a sectional view on the line 16—16 of Fig. 11.

Referring to Figs. 3 to 6, 20 designates a relatively flat member such as a dynamo field frame which has been assembled with a pair of diametrically opposite pins 21, a pair of diametrically opposite pins 22, a pair of diametrically opposite studs 23 and a pair of diametrically opposite studs 24. The stud 23 includes a rod which has molded around it a cylindrical body 23a of insulating material. Similarly, the stud 24 includes a rod having a cylindrical insulating body 24a. The bodies 23a and 24a have been molded around these studs before the studs are assembled with the frame 20. The frame 20 is provided with an aperture 25 for receiving a shaft journalled in the frame, and the aperture 25 is closed by a disc 26 press fitted into a suitable recess 27.

Work holder block 30 is provided with pairs of holes 31, 32, 33, and 34, which respectively receive and locate the pairs of pins 21, 22, 23, and 24. These holes are interrupted by notches 35 which are cut with a circular cutter deeply into the block in order to permit cleaning out these holes by a blast from a jet of compressed air applied to the holes and to the notches. Since the pins 21 are shorter than the pins 22 the holes 31 and 32 receiving these pins respectively are partly closed by plugs 41 and 42, the pins 42 being shorter so as to permit a longer portion of the pins 22 to extend into the work holder holes 32. Likewise the stud 23 is shorter than the stud 24, hence the holes 33 and 34 are closed respectively by a relatively long plug 43 and the relatively short plug 44. When the pins and studs are pushed as far down into their respective locating holes until they rest upon the tops of their respective plugs which occupy the holes, the upper ends of the pins and studs will be substantially on the same level. The work holder block 30 carries a rod 36 provided with a shoulder 37 adapted to receive the edge 37a of the dynamo frame 20 with a surface 38 for receiving the annular surface 38a of the frame 20 and with a recess 39 for receiving a pin 40 (see Fig. 3) which is to be forced into a suitable hole provided by the frame 20. The function of the pin 40 is that of cooperating with a suitable hole provided in the end of the cylindrical dynamo field frame for the purpose of locating the end frame properly with respect to the field frame.

Before the dynamo frame 20 is forced down toward the work holder so that its recesses will receive these various pins and studs, the frame is supported by a plurality of rods 45 which are urged upwardly by springs 45a, the upper surfaces of the rods receiving the annular surface 38a of the frame 20. While resting upon the rod 45 the dynamo frame 20 is located properly by pins 46 received by holes 46a in the frame so that its pin and stud receiving holes are in alignment with the proper holes in the work holder block for receiving the pins and studs.

Each work holder block 30 is provided with three ejector pins 48 which are moved upwardly automatically by an ejector mechanism to be described and when so moved engage the annular surface 38ª of the frame 20 in order to separate it from the work holder block and to cause the pins which were temporarily located upon the block to be withdrawn with the frame 20 into which these pins and studs are tightly driven.

Each work holder is provided with a central bore 47 which receives a plug 49, the upper end of which is located so as to be received by the end surface 49a of the bearing portions of the frame 20 which is shown in Fig. 4.

Each work holder is provided with a cylindrical shank 50 which extends into a hole 51 provided by a turn table conveyor or dial plate 52. Each work holder is secured to the dial plate 52 by screws 53 shown in Fig. 10. The cylindrical shank 50 passes centrally through a disc 54 located between the block 30 and the dial 52. The disc 54 is located with respect to the block 30 by dowel pins one of which is shown at 55 in Fig. 8. The disc 54 together with the block 30 provides suitable recesses for retaining the springs 45a as shown in Fig. 9. The disc 54 provides a support for the various pins 41, 42, 43 and 44 thereby limiting downward movement of these pins within the holes which receive them.

The dial 52 rests upon a plate 60 attached by screws 61 to the bed 62 of a punch press. The plate 60 has a somewhat horseshoe shaped boss 63 which defines a recess 64 for receiving a ratchet 65 attached by screws 66 to the dial 62 (see Fig. 12). Ratchet 65 is secured by screws 67 to the flange of a hub member 68 which provides a hub also for the dial 52. This hub is journalled upon a stud shaft 69 attached by screws 70 to the plate 60. The over-travel of the dial 52 is prevented by a brake consisting of a disc 71 having a lining member 72 adapted to bear upon the upper surface of the dial 52. The frictional pressure exerted by the disc 71 can be varied by a screw 73 threaded into a tapped hole 74 in the shaft 69. The hexagonal head on the screw 73 bears against the upper surface of the disc 71. The screw 73 is locked in adjusted position by a screw 75 concentric therewith and threaded into a centrally tapped hole in the screw 73. After the screw 73 has been adjusted to produce the desired braking effect, the screw 75 is threaded downwardly until its lower end engages the bottom of the tapped hole 74. Therefore the tightening of the screw 75 will lock the screw 73.

Figure 1:
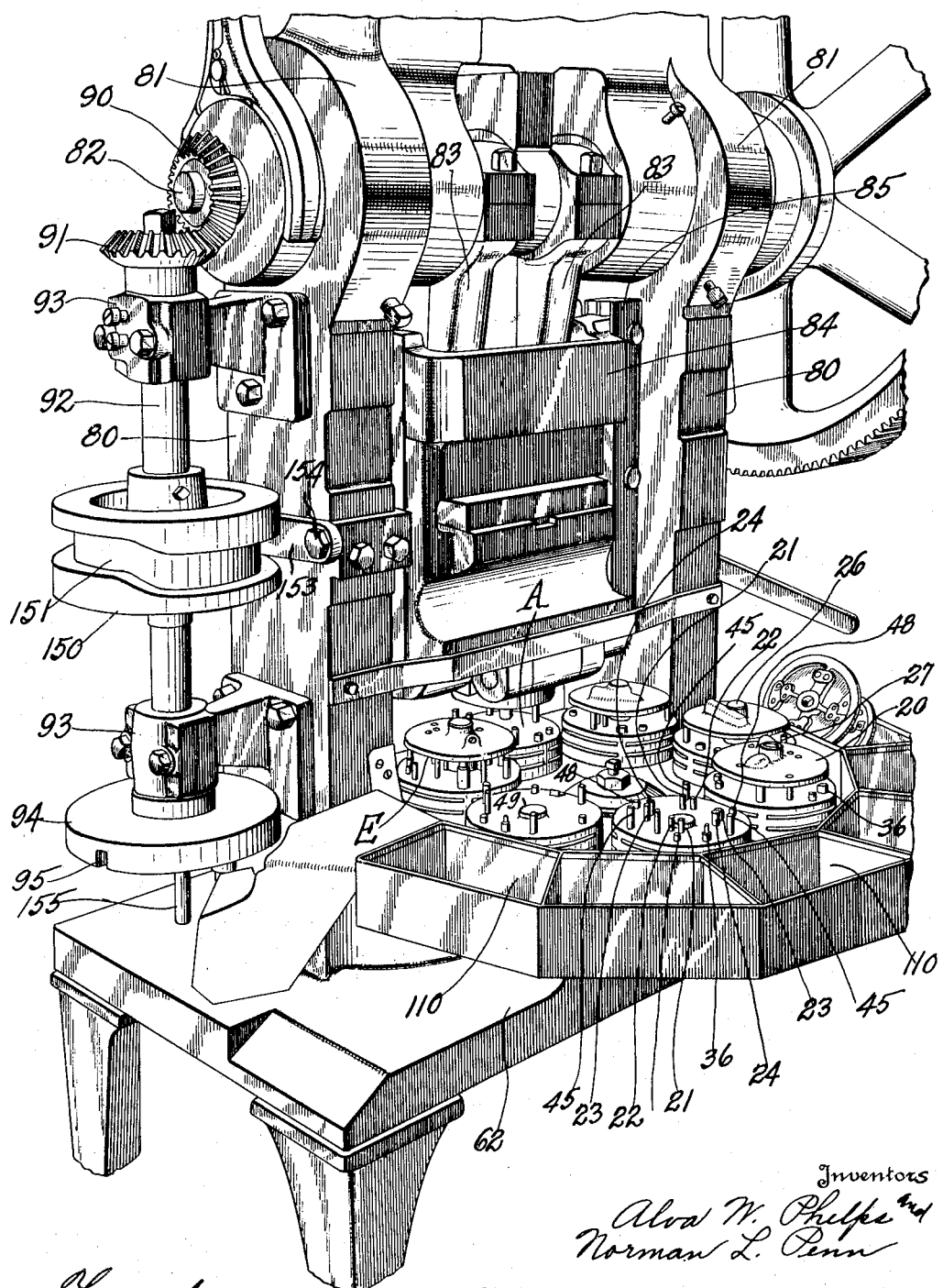
Fig. 1 is a perspective view showing a portion of the front end one side of a machine embodying the present invention.
Figure 2:
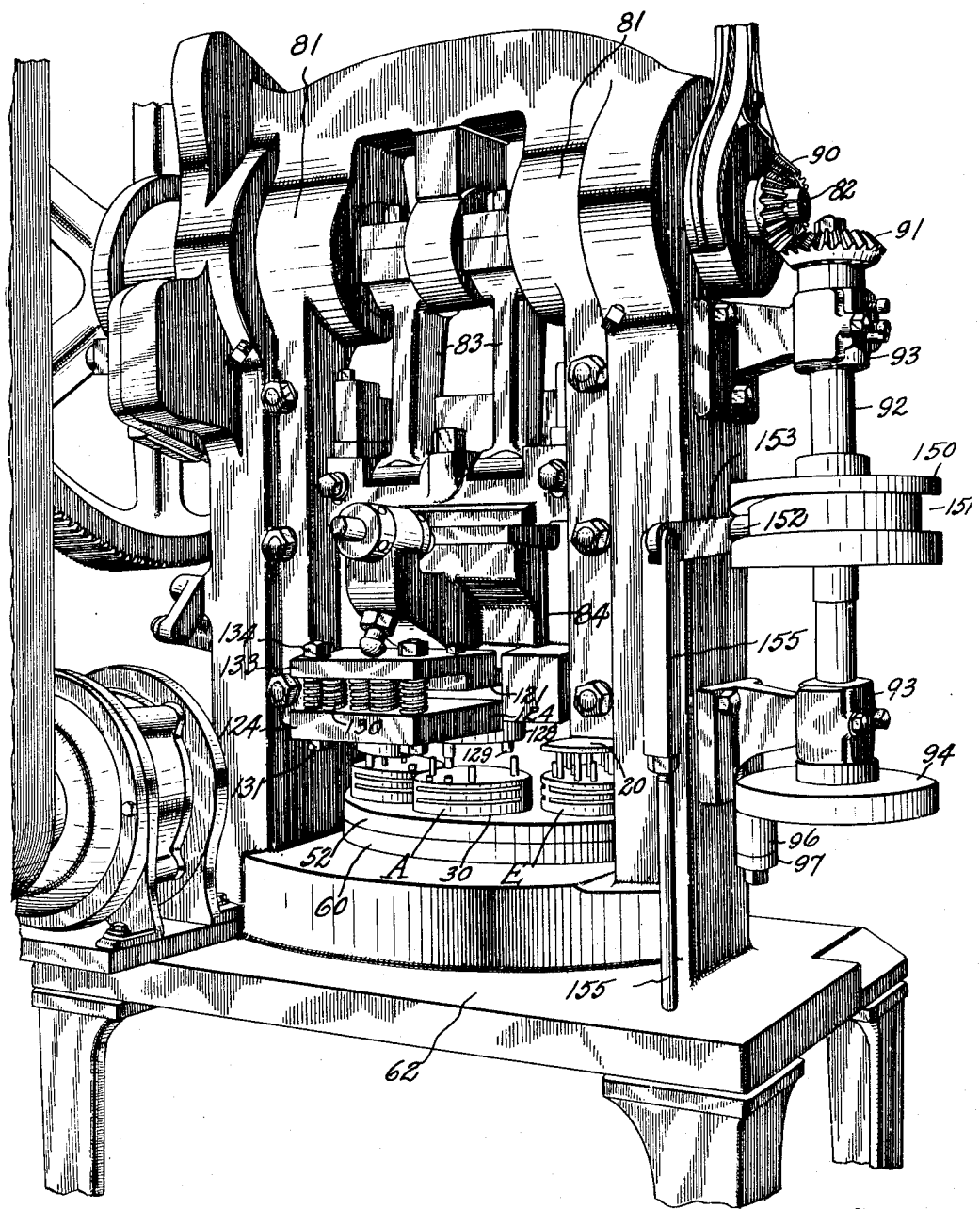
Fig. 2 is a perspective view showing a rear elevation and one side of the machine.

The punch press shown in Figs. 1 and 2 which operates the assembling mechanism comprises posts 80 supported by the base 62 and providing journals 81 for a shaft 82 having cranks or eccentrics, not shown, but connected by connecting rods 83 with a vertically movable cross head 84 which is guided for vertical movement by ways 85 attached to the posts 80. As in all punch presses one vertical reciprocation of the cross head 84 is produced during one rotation of the shaft 82.

The shaft 82 carries a bevel gear 90 meshing with a bevel gear 91 attached to a vertical shaft 92 supported by bearings 93 attached to the left hand post 80 as viewed in Fig. 1. At the lower end of shaft 93 there is attached a crank disc 94 which as shown in Fig. 14 is provided with a radial slot 95 for receiving a crank pin 96 which may be secured to the crank disc 94 in any desired position along the slot 95. The pin 96 is connected by link 97 with a slide bar 98 of dove-tail cross section which is guided for horizontal reciprocating movement by a way provided by a bevel surface 99 at the straight edge of the plate 60 and by a gib 100 which is supported by a guide frame 101 attached by screws 102 to the plate 60. The gib 100 is adjusted by screws 103 locked by nuts 104 (see Fig. 15). The slide bar 98 carries a pivot screw 105 pivotally supporting a pawl 106 urged against the ratchet 65 by spring 107 attached to the pawl by a pin 108 and to the slide bar 98 by a pin 109. The bevel gears 90 and 91 have a one-to-one ratio. Therefore, the slide bar 98 will make one horizontal reciprocation during one vertical reciprocation of the cross head 84. The crank disc 94 is so located with respect to the eccentrics which operate the connecting rod 83 that during a downward movement of the cross head 84 the pawl 106 will be moved toward the left as viewed in Fig. 14, and so that during the upward movement of the cross head 84 the pawl 106 will be moved toward the right in order to feed the dial 52 in a counter-clockwise direction as viewed from above through an angular distance equal to the angular spacing between the work holders on the dial.

In front of the dial are located a series of trays 110 for containing various parts which are to be assembled by the machine. More than one operator may be seated in front of these trays, each operator picking up certain pieces and locating them upon the work holders. Before the work holders pass to the place where the assembling takes place each work holder will have been supplied with all of the pins and stubs referred to, a frame 20 will have been placed upon the supporting pins 45 with the locating pins 46 received by the holes 46a of the frame 20, and the recess 27 of each frame 20 will have received a closure disc 26.

When the work is vertically under the cross head 84 it will be engaged by a punch press operated device which will now be described with respect to Figs. 11, 12 and 13. To the lower end of the cross head 84 screws 120 attach a plate 121 provided with ears 122 which support a rod 123 providing a pivot for a plate 124 which has an aperture 125 across which a pivot pin 126 extends. The pin 126 pivotally supports a lug 127 extending upwardly from a pressure pad 128 carrying a plurality of pins 129 each of which is adapted to bear against the upper surface of the plate or frame 20. The plate 124 is urged downwardly by springs 130 against the heads 131 of screws 132 which pass through plain holes in the plate 124 and are threaded into tapped holes in a plate 133 attached by screws 134 to the plate 121. Nuts 134 lock the screws 132 in threaded engagement with the plate 133. Other springs 135 surrounding pins 136 operate to separate the plate 124 from the plate 133. Fig. 12 shows the position of the plate 20 when resting upon the rods 45 which are shown in Fig. 9. Fig. 12 shows a hole 21a in the plate 20 located vertically above a pin 21 received by hole 31 in the work holder block 30 and supported upon a plug 41 as shown more clearly in Fig. 13. Fig. 12 shows the plate 20 provided with a hole 24b for receiving the stud portion 24a of the stud 24 directly below it, said stud being received by hole 34 in the work holder and resting upon a plug 44.

When the cross head 84 has moved to its lowest position, the frame 20 will have been engaged by the pins 129 and forced downwardly upon the work holder 30 thereby causing the frame to be forced over the various pins and studs such as 21 and 24 shown in Fig. 13. During the downward movement of the pressure pad 128 a plug pin 140 carried thereby will engage the closure plug 26 and render it less convex in order to force it tightly into engagement with the annular shoulder 27a of the orifice 27. During the expansion of the plug 26 the pressure upon the bearing portion 25 is transmitted to the plug 49 which receives the surface 49a of the frame 20. The pressure pad is pivotally connected with the cross head in order to accommodate itself to variations in the upper surface of the frame 20 with which its pins 129 engage. The downward pressure of the punch press cross head 84 is yieldingly transmitted to the pressure pad 128 through the springs 130 and 135. This construction permits of properly assembling the pins and studs with the dynamo frames although there may be some variation in the thickness of the frames. If the frames are thicker than others, then the pressure pad 128 cannot be moved downwardly as far as would be possible if the frames were somewhat thinner. Since the downward travel of the cross head 84 cannot be varied, it must be given sufficient travel to take care of the necessary movement required for pressing the thinnest of the frames over the pins and studs. Therefore, when the pressure pad pins 129 engage a thicker frame 20 the downward travel of the cross head 84 will exceed that of the pressure pad 128. The present invention provides a lost motion connection between the cross head 84 and the plate 124. Since the screws 132 pass loosely through the plate 124 there may be downward movement of the plate 133 relative to the plate 124. The springs 130 and 135 transmit pressure yieldingly and therefore limit the amount of pressure which is exerted by the punch press upon the work holders. These springs also operate to take up the lost motion between the plates 124 and 133 as the press head moves upwardly.

After an assembling operation has been performed, and the cross head 84 moves upwardly, the assembled work may remain in the position shown in Fig. 13 although the springs 45a shown in Fig. 9 tend to move the work upwardly. The assembling station is indicated at A in Figs. 1 and 2 and the ejecting station at E. When a work holder arrives at the ejecting station E the assembled work will be elevated into the position shown in Fig. 16 by automatic mechanism associated with the ejecting pins 48. This mechanism comprises as many ejecting rods 140 as there are pins 48. The rods 140 slide vertically through holes 141 in base 62 and plate 60. When a work holder is at ejecting station E the holes 141 will be in vertical alignment below holes 142 in dial 52, said holes 142 being in vertical alignment with holes 143 provided in the work holders 30 for receiving the pins 48. While the dial 52 is at rest and during the downward movement of the punch press head 84, the pin 140 will be moved upwardly into the position shown in Fig. 16 by a mechanism comprising a cam 150 having a race 151 engaged by a cam roller 152 attached to a lever 153 pivotally connected with a post 80 by a screw 154. The lever 153 is connected by link 155 with a lever 156 which as shown in Fig. 16 is pivoted at 157 upon a bracket 158 attached by screws 159 to the base 62. The lever 156 is provided at the left end with a slot 160 for receiving the pin 161 carried by the link 155. At the right hand end the lever 156 is provided with a slot 162 for receiving a pin 163 carried by the bifurcated ear 164 of a bracket 165 attached by screws 166 to a plate 167 to which the ejecting rods 140 are attached. The cam 150 is so timed with relation to the shaft 82 that during downward movement of the cross head 84 the pins 140 will be caused to move upwardly in order to eject the work at station E from its work holder.

The work having been ejected, it is removed from the work holder by one of the operators who sit in front of the trays 110 for the purpose of mounting the parts to be assembled upon the work holders.

While the form of embodiment of the present invention as herein disclosed, constitutes a preferred form, it is to be understood that other forms might be adopted, all coming within the scope of the claims which follow.

What is claimed is as follows:

1. Apparatus for assembling parts one of which is provided with recesses into which other parts are pressed, comprising in combination, a work holder having vertically extending recesses located to correspond with the recesses of the recessed part, said work holder recesses receiving and locating the parts to be pressed into the recesses of the recessed part, said work holder having means for supporting the recessed part with its recesses in alignment respectively with the work holder recesses and means for yieldingly supporting the recessed part above the other parts held by the work holder, and means for moving the recessed part toward the work holder in order to cause the other parts to be pressed into the recesses of the recessed part.

2. Apparatus for assembling pins and a plate having recesses into which the pins are pressed, comprising in combination, a work holder having pin locating recesses located to correspond with the pin receiving recesses of the plate and having locating pins entering certain other recesses in the plate and having rods supported by springs for yieldingly supporting the plate above the pins to be pressed into it, and means for moving the plate toward the work holder in order to cause the pins to be forced into the recesses of the plate.

3. Apparatus for assembling a plate having recesses opening at least on one side with other parts to be pressed into said recesses at one side of the plate, said plate having a recess opening on the opposite side of the plate for the purpose of receiving another press fitted member, comprising in combination, a work holder having means for supporting the plate with its first mentioned recesses facing the work holder and located respectively in alignment with recesses in the work holder for supporting parts to be pressed into the recesses of the plate which face the work holder, means for moving the plate into engagement with the work holder in order to cause the parts carried by the work holder to become attached to the plate, and means for press fitting a member within a recess in the plate on its side facing away from the work holder concurrently with pressing the other parts into the plate.

4. Apparatus for assembling parts, one having recesses into which other parts may be pressed, comprising in combination, a plurality of work holders each having recesses for receiving the parts which are to be attached to the recessed part and having means for locating the recessed part so that its recesses are in alignment respectively with the other parts, a conveyor for moving the work holders successively past loading, pressing and ejecting stations, means for pressing the recessed part toward the work holder at the pressing station, and means for ejecting the assembled parts from the work holder at the ejecting station.

5. Apparatus for assembling parts, one having recesses into which other parts may be pressed, comprising in combination, a plurality of work holders each having recesses for receiving the parts which are to be attached to the recessed part and having means for locating the recessed part so that its recesses are in alignment respectively with the other parts, a horizontal turn-table conveyor for moving the work holders successively past loading, pressing and ejecting stations, a vertically reciprocating pressure head, a pressure pad engageable with the recessed part and carried by the head, resilient means for transmitting pressure from the head to the pad when the pad presses the recessed part against the other parts, and means for ejecting the assembled parts from the work holder at the ejecting station.

6. Apparatus for assembling parts, one having recesses into which other parts may be pressed, comprising in combination, a plurality of work holders each having recesses for receiving the parts which are to be attached to the recessed part and having means for locating the recessed part so that its recesses are in alignment respectively with the other parts, and means for resiliently urging the recessed part against the parts carried by the work holder.

7. Apparatus for assembling parts, one having recesses into which other parts may be pressed, comprising in combination, a plurality of work holders each having recesses for receiving the parts which are to be attached to the recessed part and having means for locating the recessed part so that its recesses are in alignment respectively with the other parts, and self adjusting means engaging the recessed part at a plurality of points for urging the recessed part against the parts carried by the work holder.

In testimony whereof we hereto affix our signatures.

ALVA W. PHELPS.
NORMAN L. PENN.